United States Patent Office 3,525,716
Patented Aug. 25, 1970

3,525,716
PROCESS FOR THE POLYMERIZATION OF CYCLIC ETHERS
Seizo Okamura, Kyoto, Japan, and Lars O. Oldsberg, Perstorp, Sweden, assignors to Perstorp AB, Perstorp, Sweden
No Drawing. Filed June 9, 1967, Ser. No. 673,524
Claims priority, application Sweden, June 9, 1966, 7,886/66
Int. Cl. C08g 1/04
U.S. Cl. 260—67   2 Claims

ABSTRACT OF THE DISCLOSURE

Process for the polymerization of cyclic ethers such as trioxane, dioxolane, etc., either separated or in admixture with each other or optionally together with vinyl compounds, olefins, etc., characterized in that a small amount of tetraoxane is added to the reactants.

---

The present invention relates to an improved process for the polymerization of cyclic ethers or acetals such as trioxane, dioxolane etc. and is specially concerned with a decrease of the inhibition time.

By polymerization of cyclic ethers or acetals such as trioxane or trioxane together with dioxolane or other comonomers, a polymer is obtained which consists of either only recuring CHO units or CHO units interspersed with other units such as C—C units. These polymers are generally called polyoxymethylene and are usually produced by the polymerization of cyclic acetals in the presence of electrofillic catalysts such as $BF_3$ or etherates thereof. The polymers can also be produced by direct polymerization of monomeric formaldehyde. These polymers are described more in detail in, e.g., the U.S. Pats. 2,795,571 and 3,027,352.

When for instance trioxane is copolymerized with dioxolane using $BF_3$-etherate as a catalyst, a decomposition occurs, and the decomposed units are connected with each other.

The exact procedure has up to now not been clarified completely. Possibly free formadehyde is formed in a certain stage. It is also possible that a ring-formation occurs. These heterocyclic compounds thus formed may be opened again and may take part in further reactions.

It has now been shown that a certain amount of tetraoxane is formed during the reactions. This formatiton takes place at the expense of the polymer formation and gives rise to an inhibition time not desired.

According to the present invention the formation of tetraoxane is depressed and the inhibititoin time minimized by adding a certain amount of tetraoxane in the mixture of the starting materials. These may consist of trioxane or of trioxane together with other cyclic ethers such as dioxolane. The amount of tetraoxane that shall be added is not critical.

An addition of less than 10 percent by weight is usually convenient as the inhibititon time by such an addition dereases to practically 0. Any further addition of tetraoxane is therefore unnecessary. If, however, a higher velocity of the polymerization itself is desired, larger amounts of tetraoxane, i.e. 20–30 percent, may be used.

Cyclic ethers as for instance trioxane, dioxolane and ethylene oxide may be polymerized in the solid phase, the liquid phase, the gaseous phase, or in solution. The addition of tetraoxane has the same effect independently of the aggregatiton state and the catalyst used.

Unsaturated compounds may be polymerized together with the cyclic ethers. Suitable such compounds are the well-known compounds vinyl ethers, styrene, derivates of styrene such as α-methyl-styrene and ring-substituted styrenes, allyl ethers, isobutene, butadiene, isoprene, cyclohexene, etc.

The results of experiments with a mixture comprising 95 percent trioxane and 5 percent dioxolane to which 0.5–10 percent by weight tetraoxane has been added are shown in the table below. As appears, the inhibititon time without any addition of tetraoxane is 25–30 seconds but decreases appreciably even by a slight addition of tetraoxane. The polymerization was carried out in melt at 60° C. with an addition of 5 percent by weight cyclohexane.

| Polymerization of trioxane with— | | Percent by weight catalyst | Inhibition time, seconds |
|---|---|---|---|
| Percent Tetraoxane | Percent Dioxolane | | |
| 5 | 5 | 0.022 | 5 |
| 5 | 5 | 0.022 | 2 |
| 5 | 5 | 0.022 | 2 |
| 10 | 5 | 0.022 | 2 |
| 10 | 5 | 0.022 | 2 |
| 20 | 5 | 0.022 | 2 |
| 0 | 5 | 0.022 | 25–30 |

Besides the decrease of the inhibition time the polymerization process itself becomes faster. That means that without any other actions than adding tetraoxane, the polymerization time may be decreased. With continuous polymerization processes a smaller apparatus may be used which is of importance from the point of view of the investment and working costs. It also makes possible the use of catalysts normally giving rise to a low polymerization.

We claim:
1. In a process for the homopolymerization of trioxane, the improvement which comprises decreasing the inhibition time by adding 0.5–30 percent by weight of tetraoxane to the monomeric starting material.
2. In a process for the copolymerization of a monomeric starting material comprising trioxane and at least one other monomer selected from the group consisting of dioxolane, ethylene oxide, vinyl ethers, styrene, α-methyl-styrene, ring-substituted styrenes, allyl ethers, isobutene, butadiene, isoprene and cyclohexene, the improvement which comprises decreasing the inhibition time by adding 0.5–30 percent by weight of tetraoxane to the monomeric starting material.

References Cited

UNITED STATES PATENTS

| 3,027,352 | 3/1962 | Walling et al. | 260—67 |
| 3,317,477 | 5/1967 | Wilson et al. | 260—73 |
| 3,397,181 | 8/1968 | Halek et al. | |

OTHER REFERENCES

Cherdron et al., Die Makromolekulare Chemie, vol. 52, April 1962, pp. 48–58.

WILLIAM H. SHORT, Primary Examiner

L. M. PHYNES, Assistant Examiner

U.S. Cl. X.R.

260—73, 2, 615, 340